United States Patent
Shintani et al.

(10) Patent No.: US 9,402,220 B2
(45) Date of Patent: Jul. 26, 2016

(54) ELECTRONIC APPARATUS

(71) Applicant: Panasonic Intellectual Property Management Co., Ltd., Osaka (JP)

(72) Inventors: Dai Shintani, Osaka (JP); Yuichi Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/601,650

(22) Filed: Jan. 21, 2015

(65) Prior Publication Data
US 2015/0133194 A1    May 14, 2015

Related U.S. Application Data

(63) Continuation of application No. PCT/JP2013/004456, filed on Jul. 22, 2013.

(30) Foreign Application Priority Data

Jul. 23, 2012  (JP) .................................. 2012-162371

(51) Int. Cl.
*H04W 40/02* (2009.01)
*H04M 1/725* (2006.01)
*H04N 5/232* (2006.01)

(52) U.S. Cl.
CPC ............ *H04W 40/02* (2013.01); *H04M 1/7253* (2013.01); *H04M 2250/06* (2013.01); *H04N 5/23206* (2013.01)

(58) Field of Classification Search
CPC .............................. H04W 40/02; H04W 88/02
USPC ................................................ 455/557, 11.1
See application file for complete search history.

(56) References Cited

U.S. PATENT DOCUMENTS 7,362,869 B2 * 4/2008 Landrock ............. G06Q 20/341
                                                    380/277
7,484,008 B1 * 1/2009 Gelvin .................... H04L 67/12
                                                    701/408

(Continued)

FOREIGN PATENT DOCUMENTS

JP        11-234748 A     8/1999
JP      2003-216082 A     7/2003

(Continued)

OTHER PUBLICATIONS

International Search Report for corresponding International Application No. PCT/JP2013/004456 mailed Oct. 22, 2013.

(Continued)

*Primary Examiner* — Hai V Nguyen
(74) *Attorney, Agent, or Firm* — Renner, Otto, Boisselle & Sklar, LLP

(57) ABSTRACT

An electronic apparatus is capable of sharing connection information for connecting to a specific communication line with another apparatus. The electronic apparatus includes a first communication unit configured to communicate with a base station through the specific communication line, a second communication unit configured to perform communication different from the communication performed by the first communication unit, a detection unit configured to detect, via the second communication unit, whether the another apparatus is operating, and a controller configured to control communication performed by the first and second communication units. The controller controls, on the basis of a detection result from the detection unit, whether to perform communication through the specific communication line by the first communication unit.

10 Claims, 6 Drawing Sheets

(56) References Cited

U.S. PATENT DOCUMENTS

| | | | | |
|---|---|---|---|---|
| 7,561,879 B2* | 7/2009 | Kuchibhotla | | H04W 48/12 370/331 |
| 7,606,559 B2* | 10/2009 | Aarnio | | H04H 60/14 455/406 |
| 7,689,251 B2* | 3/2010 | Bae | | H04W 12/12 455/550.1 |
| 7,986,971 B2* | 7/2011 | Anckar | | H04W 88/10 370/352 |
| 8,036,647 B2* | 10/2011 | Matsumura | | G06Q 10/00 340/933 |
| 8,060,139 B2* | 11/2011 | Yaqub | | H04L 63/0853 455/411 |
| 8,265,046 B2* | 9/2012 | Kuokkanen | | H04W 12/08 370/338 |
| 8,359,349 B2* | 1/2013 | Aaltonen | | G06Q 30/060 455/101 |
| 8,478,340 B1* | 7/2013 | Deloatch | | G06K 7/0021 455/411 |
| 8,515,436 B2* | 8/2013 | Song | | H04W 76/068 455/410 |
| 8,649,325 B2* | 2/2014 | Thach | | H04L 29/08846 370/315 |
| 8,682,243 B2* | 3/2014 | Bienas | | H04W 48/18 455/11.1 |
| 8,750,931 B2* | 6/2014 | Park | | H04W 8/183 455/552.1 |
| 8,917,212 B2* | 12/2014 | Prather | | H04B 17/10 343/703 |
| 8,918,144 B2* | 12/2014 | Shu | | H04M 1/0254 455/558 |
| 8,958,770 B2* | 2/2015 | Baldwin | | H04M 15/00 455/344 |
| 9,026,080 B2* | 5/2015 | Moran | | H04W 12/06 380/44 |
| 9,048,926 B2* | 6/2015 | Zheng | | H04W 8/183 |
| 9,084,282 B2* | 7/2015 | Rajan | | H04L 63/0823 |
| 9,113,438 B2* | 8/2015 | Kuchibhotla | | H04W 60/04 |
| 9,130,651 B2* | 9/2015 | Tabe | | H04B 1/3838 |
| 2001/0031645 A1* | 10/2001 | Jarrett | | H04M 1/006 455/552.1 |
| 2004/0203346 A1* | 10/2004 | Myhre | | H04W 88/04 455/11.1 |
| 2004/0235522 A1* | 11/2004 | Lin | | H04W 8/183 455/558 |
| 2005/0041673 A1* | 2/2005 | Jiang | | H04L 47/10 370/401 |
| 2005/0069137 A1* | 3/2005 | Landrock | | G06Q 20/341 380/278 |
| 2005/0113069 A1* | 5/2005 | Knauerhase | | G06F 21/43 455/411 |
| 2005/0159184 A1* | 7/2005 | Kerner | | H04L 63/0853 455/558 |
| 2005/0209927 A1* | 9/2005 | Aaltonen | | G06Q 30/0601 705/26.1 |
| 2006/0143295 A1* | 6/2006 | Costa-Requena | | H04L 63/0428 709/227 |
| 2006/0291455 A1* | 12/2006 | Katz | | H04L 29/06 370/355 |
| 2007/0076760 A1* | 4/2007 | Wennberg | | H04W 8/205 370/477 |
| 2008/0113687 A1* | 5/2008 | Prendergast | | H04L 63/0853 455/558 |
| 2009/0197641 A1* | 8/2009 | Rofougaran | | G03G 15/6508 455/556.1 |
| 2009/0209202 A1* | 8/2009 | Martini | | H04W 12/02 455/41.2 |
| 2009/0209287 A1* | 8/2009 | Ravelo | | G06F 1/1632 455/556.1 |
| 2009/0257412 A1* | 10/2009 | Kuokkanen | | H04W 12/08 370/338 |
| 2009/0270127 A1* | 10/2009 | Kakimoto | | H04B 1/3816 455/558 |
| 2010/0035650 A1* | 2/2010 | Gottehrer | | G06F 1/1632 455/558 |
| 2010/0100735 A1* | 4/2010 | Rajan | | H04L 63/0823 713/168 |
| 2011/0086610 A1* | 4/2011 | Baldwin | | H04M 15/00 455/405 |
| 2011/0092252 A1* | 4/2011 | Besay | | H04W 8/183 455/558 |
| 2011/0117964 A1* | 5/2011 | Luo | | H04W 48/18 455/558 |
| 2011/0275364 A1* | 11/2011 | Austin | | H04L 41/12 455/423 |
| 2011/0319132 A1* | 12/2011 | Hsu | | H04M 1/0254 455/558 |
| 2012/0032876 A1* | 2/2012 | Tabe | | H04B 1/3838 345/156 |
| 2012/0034933 A1* | 2/2012 | Bradley | | H04W 12/06 455/456.3 |
| 2012/0196654 A1* | 8/2012 | Jin | | H04W 12/06 455/558 |
| 2012/0257527 A1* | 10/2012 | Jorgensen | | H04L 1/20 370/252 |
| 2012/0264375 A1* | 10/2012 | Shankaranarayanan | | H04L 12/1475 455/41.2 |
| 2012/0284426 A1* | 11/2012 | Smith | | H04W 4/00 709/248 |
| 2012/0290907 A1* | 11/2012 | Smith | | G06F 17/30268 715/203 |
| 2013/0097280 A1* | 4/2013 | Aaltonen | | G06Q 30/0601 709/217 |
| 2013/0288747 A1* | 10/2013 | Shu | | H04M 1/0254 455/558 |
| 2013/0295998 A1* | 11/2013 | Zheng | | H04W 8/183 455/558 |
| 2013/0305322 A1* | 11/2013 | Raleigh | | G06Q 30/016 726/4 |
| 2014/0120898 A1* | 5/2014 | Thach | | H04L 29/08846 455/418 |

FOREIGN PATENT DOCUMENTS

| | | | |
|---|---|---|---|
| JP | 2006-067509 A | | 3/2006 |
| JP | 2006067509 A | * | 3/2006 |
| JP | 2006-245770 A | | 9/2006 |
| JP | 2008-048183 A | | 2/2008 |
| JP | 2010-258906 A | | 11/2010 |

OTHER PUBLICATIONS

International Preliminary Report on Patentability (English Translation) for corresponding International Application No. PCT/JP2013/004456 dated Oct. 22, 2013.

* cited by examiner

ELECTRONIC APPARATUS

CROSS-REFERENCE TO RELATED APPLICATIONS

This is a continuation application of International Application No. PCT/JP2013/004456, with an international filing date of Jul. 22, 2013, which claims priority of Japanese Patent Application No. 2012-162371 filed on Jul. 23, 2012, the contents of which are incorporated herein by reference.

BACKGROUND

1. Technical Field

The present disclosure relates to electronic apparatuses capable of performing communication through a predetermined communication line.

2. Related Art

Japanese patent application publication JP 2006-245770 A discloses a backup system of a mobile phone. In JP 2006-245770 A, Subscriber Identity Module (SIM) Cards which record the same subscriber information (ID) are inserted in a first mobile phone and a second mobile phone. A server detects power-on and power-off of each mobile phone, and makes either one of the first mobile phone and the second mobile phone be controllable. In JP 2006-245770 A, the server stores necessary data such as address book data of a mobile phone which is inserted with a main SIM card. When the mobile phone inserted the main SIM card is left at a user's home, etc. with its power turned on, a sub SIM card owned by the user is inserted in a mobile phone which is owned by a friend of the user or the like, and is capable of being inserted with a SIM card, and then the mobile phone owned by the friend is turned on. The mobile phone inserted with the sub SIM card inserted downloads, from the server, necessary data such as address book data of the mobile phone inserted with the main SIM card. Thus, backup communication means is ensured.

Japanese patent application publication JP H11-234748 A discloses a system allowing a plurality of mobile stations to perform communication with a single telephone number. In JP H11-234748 A, the single telephone number is assigned to the plurality of mobile stations, and a server stores respective positional information of the respective mobile stations. Alternatively, the server stores respective identification information for every mobile station. This allows the plurality of mobile stations to perform communication by using the single telephone number.

SUMMARY

The present disclosure provides an electronic apparatus capable of performing communication through a communication line (for example, a telephone line), wherein the electronic apparatus can exclusively use a communication line among a plurality of electronic apparatuses sharing single connection information (for example, subscriber information).

In a first aspect of the present disclosure, an electronic apparatus capable of sharing connection information for connecting to a specific communication line with another apparatus is provided. The electronic apparatus includes a first communication unit configured to communicate with a base station through the specific communication line, a second communication unit configured to perform communication which is different from the communication performed by the first communication unit, a detection unit configured to detect, via the second communication unit, whether or not the another apparatus is operating, and a controller configured to control the communications performed by the first and second communication units. The controller controls, on the basis of a detection result obtained by the detection unit, whether to perform communication through the specific communication line by the first communication unit.

In a second aspect of the present disclosure, an electronic apparatus capable of sharing connection information for connecting to a specific communication line with another apparatus is provided. The electronic apparatus includes a first communication unit configured to communicate with a base station through the specific communication line, a second communication unit configured to perform communication which is different from the communication performed by the first communication unit, and a controller configured to control the communication performed by the first and second communication units. The controller obtains connection information for connecting to the specific communication line, which is stored in the other apparatus, from the another apparatus via the second communication unit, and compares the obtained connection information with connection information for connecting to the specific communication line, which is stored in the electronic apparatus. When both pieces of connection information are matched with each other, the controller starts communication through the specific communication line by the first communication unit upon receipt of connection permission for connecting to the specific communication line from the other apparatus.

According to the present disclosure, an electronic apparatus can be provided, which is capable of performing communication through a communication line (for example, a telephone line), wherein the electronic apparatus can exclusively use a communication line among a plurality of electronic apparatus sharing single connection information (for example, subscriber information).

DETAILED DESCRIPTION OF EMBODIMENTS

With reference to the drawings as required, embodiments are described in detail below. However, unnecessarily detailed description may be omitted. For example, detailed description of already well-known matters and repeated description of substantially the same configuration may be omitted. Such omissions are intended to prevent the following description from being unnecessarily redundant and to facilitate understanding by those skilled in the art. The inventor(s) provide the accompanying drawings and the following description for those skilled in the art to help them to fully understand the present disclosure and do not intend to limit the subject described in the claims by the accompanying drawings or the following description.

An imaging apparatus (one example of an electronic apparatus) of the present disclosure is provided with a SIM card which stores subscriber information (telephone number, and so on), and includes a communication line control unit operable to control a telephone line (for example, 3G or LTE (Long Term Evolution)) and a wireless communication unit operable to control wireless communication (for example, wireless LAN or NFC (Near Field Communication)).

On the other hand, a mobile terminal is provided with a SIM card which stores the same subscriber information as that of the SIM card inserted in the imaging apparatus), and includes a communication line control unit operable to control a telephone line (for example, 3G or LTE (Long Term Evolution)) and a wireless communication unit operable to control wireless communication (for example, wireless LAN or NFC).

According to the configuration of the present disclosure, even when common subscriber information is stored in the SIM cards of the imaging apparatus and the mobile terminal, it is possible to switch communication between a server and the imaging apparatus or the mobile terminal. Accordingly, the user does not need to acquire a plurality of telephone subscription rights, which reduces burden of a contract charge and communication fees. In addition, two-way communication between the imaging apparatus and the mobile terminal is available all the time by means of wireless communication, so that GPS positional information of the mobile terminal can be attached to an image captured by the imaging apparatus and the captured image can be stored in the mobile terminal.

Embodiments of imaging apparatuses provided with communication units according to the present disclosure are described below. The embodiments described below are merely exemplary embodiments, and the present disclosure is not limited thereto.

First Embodiment

1. Camera System

Figure 1:
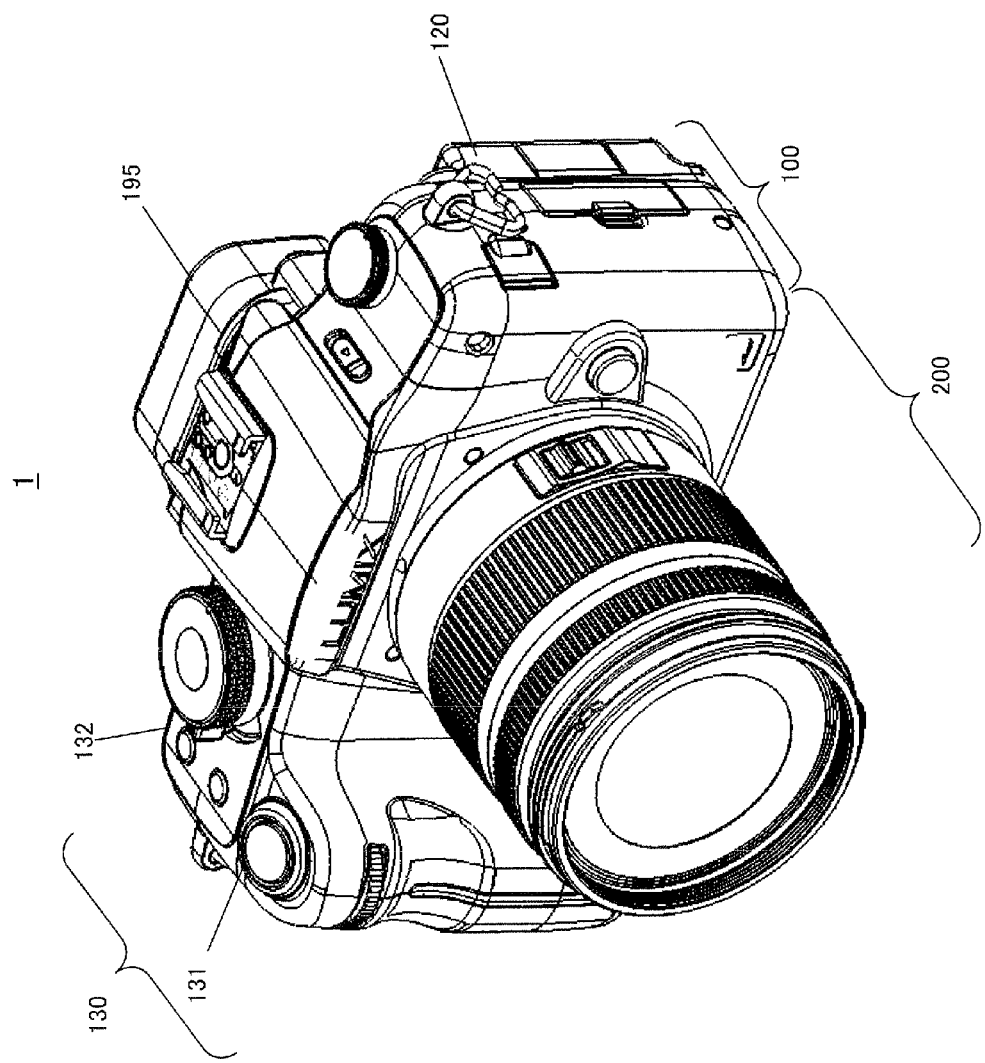
FIG. 1 is a perspective view of a camera system according to the present embodiment.
Figure 2:
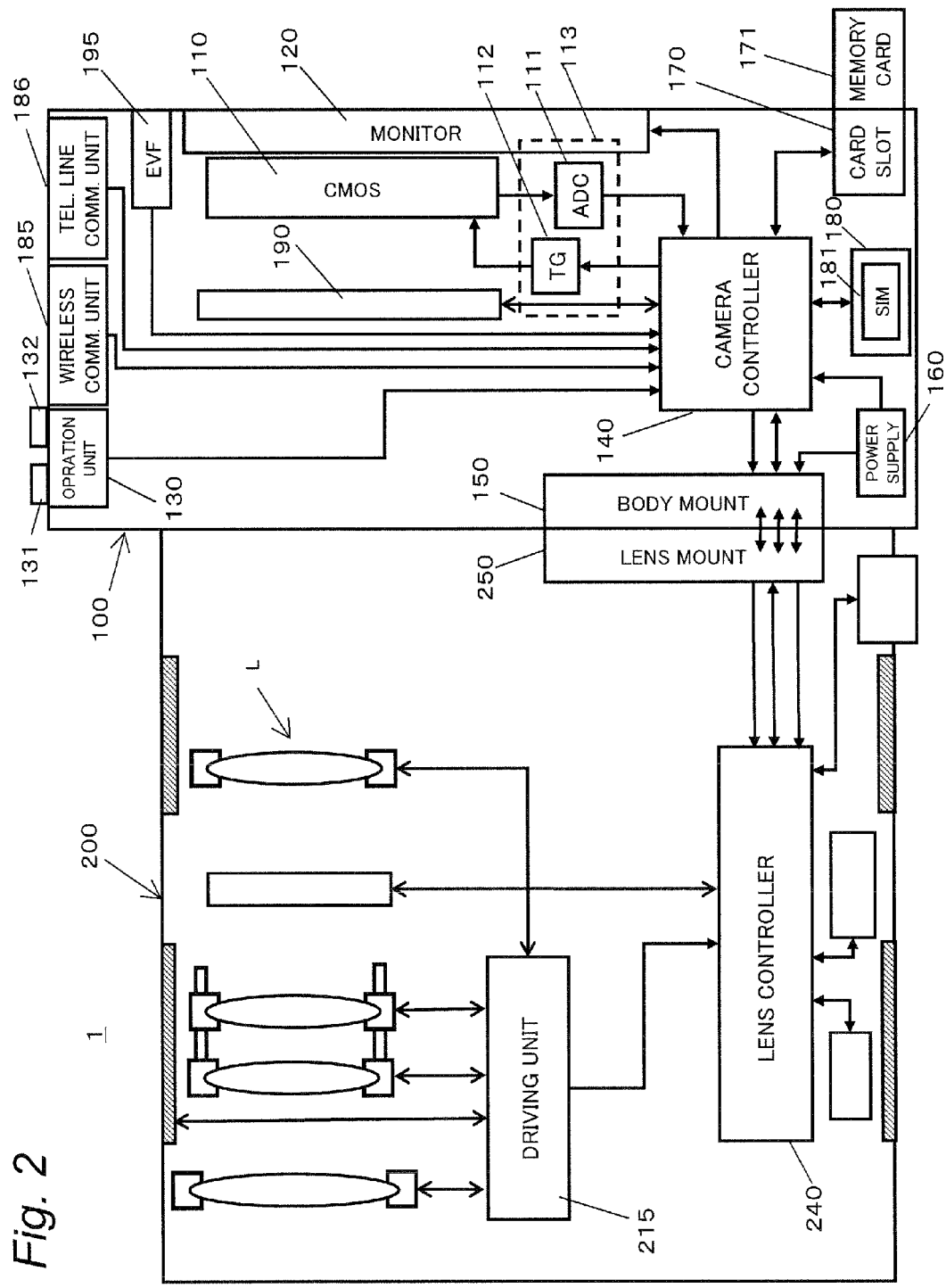
FIG. 2 is a circuit block diagram of the camera system.

Referring to FIGS. 1 and 2, a camera system is described below as an example of an electronic apparatus according to the present disclosure. An electronic apparatus of the present disclosure can be applied to electronic apparatuses (for example, an imaging apparatus) other than the camera system of this embodiment.

FIG. 1 is a perspective view of a camera system (an example of an electronic apparatus) according to the first embodiment.

FIG. 2 is a circuit block diagram of the camera system 1. The camera system 1 is an interchangeable lens type digital camera. A lens unit 200 can be mounted on a body mount 150 of a camera body 100.

The camera body 100 includes mainly a CMOS (Complementary Metal Oxide Semiconductor) image sensor 110, a CMOS circuit board 113, a camera monitor 120, an operation unit 130, a camera controller 140, a body mount 150, a power supply 160, a card slot 170, a SIM card holder 180, a wireless communication unit 185, a telephone line communication unit 186, a focal-plane shutter 190, and an EVF (Electric View Finder) 195.

The CMOS image sensor 110 (an example of an imaging sensor) converts an optical image (hereinafter referred to as a subject image) of a subject incident on the CMOS image sensor 110 through the lens unit 200 into image data. The generated image data is digitized by an A/D converter 111 in the CMOS circuit board 113. The camera controller 140 performs various image processings on the image data digitized by the A/D converter 111. Here, the various image processings include, for example, a gamma correction processing, a white balance adjustment processing, a crack adjusting processing, a YC conversion processing, an electronic zoom processing, a JPEG compression processing, and so on.

The CMOS image sensor 110 operates in synchronization with a timing signal generated by a timing generator 112. The CMOS image sensor 110 is controlled by the CMOS circuit board 113 to generate still image data and moving image data. The generated moving image data is also used to display a through image. The still image data and the moving image data are examples of image data.

Here, the through image refers to an image that is not recorded in a memory card 171. The through image is mostly a moving image, and is displayed on the camera monitor 120 or the EVF 195 for allowing a user to determine a composition of a moving image or a still image.

The CMOS image sensor 110 can generate a moving image with low resolution which is used as a through image, and a moving image with high resolution which is used for recording. The moving image with high resolution is, for example, a moving image in HD size (Hi-Vision size: 1920×1080 pixels). The CMOS image sensor 110 is an example of an imaging sensor for converting an optical image of a subject into an electrical image signal. The imaging sensor is a general device including a photoelectric conversion device such as a CCD image sensor, as well as the CMOS image sensor 110.

The CMOS circuit board 113 controls the CMOS image sensor 110. The CMOS circuit board 113 performs predetermined processing on an image data output from the CMOS image sensor 110, and includes the timing generator 112 and the A/D converter 111. The CMOS circuit board 113 is an example of an imaging sensor circuit board that controls driving of an imaging sensor such as the CMOS image sensor, and that performs a predetermined processing such as an A/D conversion on the image data which is output from the imaging sensor.

The camera monitor 120 is, for example, a liquid crystal display (LCD), and displays an image, etc. indicated by image data for display. The image data for display is generated by the camera controller 140. The image data for display includes, for example, image data subjected to an image processing, and data for displaying, as an image, shooting conditions of the camera system 1, operation menu, etc. The camera monitor 120 can selectively display a moving image and a still image.

The camera monitor 120 is mounted on the camera body 100. Although, in this embodiment the camera monitor 120 is provided at a rear surface of the camera body 100, the camera monitor 120 may be provided at an arbitrary position on the camera body 100. In addition, the camera monitor 120 may be fixedly attached on the camera body 100, or movably attached on the camera body 100.

The camera monitor 120 is an example of a display unit provided in the camera body 100. The display unit may include, in addition to the above, a device that can display images such as an organic EL device, an inorganic EL device, or a plasma display panel, and so on. In addition, the display unit may be mounted on a side surface or an upper surface of the camera body 100, instead of the rear surface.

The operation unit 130 receives operation performed by a user. Specifically, the operation unit 130 includes a release button 131 that receives an operation related to a focal-plane shutter performed by a user, and a power switch 132 which is a revolving dial switches mounted on the upper surface of the camera body 100. The power switch 132 can be selected between ON and OFF. The operation unit 130 can include a button, a lever, a dial, a touch panel, and so on, provided that these can receive operations performed by a user.

The camera controller 140 controls components provided in the camera body 100. The camera controller 140 receives instructions from the operation unit 130. The camera controller 140 transmits a signal for controlling the lens unit 200 to a lens controller 240 via the body mount 150 and the lens mount 250, to control indirectly each of components of the lens unit 200. Accordingly, the camera controller 140 controls whole the camera system 1.

The camera controller 140 controls the CMOS circuit board 113. Specifically, the camera controller 140 transmits a control signal to the CMOS circuit board 113, and then the CMOS circuit board 113 controls the CMOS image sensor 110 on the basis of the received control signal. That is, the camera controller 140 controls the CMOS image sensor 110. In addition, the camera controller 140 acquires image data which is generated by the CMOS image sensor 110 and is subjected to a predetermined processing such as an A/D conversion by the CMOS circuit board 113. The camera controller 140 further performs a predetermined processing on the acquired image data. For example, the camera controller 140 generates image data for display, moving image data for record, and so on, based on the image data processed by the CMOS circuit board 113.

The card slot 170 can be inserted with a memory card 171. The card slot 170 controls the memory card 171 in accordance with a control signal transmitted from the camera controller 140. Specifically, image data (still image data/moving image data) is stored in the memory card 171, and image data (still image data/moving image data) is output from the memory card 171, via the card slot 170.

The memory card 171 can store image data which is generated by an image processing performed by the camera controller 140. For example, the memory card 171 can store various files, such as an uncompressed RAW image file and a compressed JPEG image file. In addition, the memory card 171 can output image data or an image file previously stored therein, via the card slot 170. The image data or image file which is output from the memory card 171 can be subjected to an image processing by the camera controller 140. For example, the camera controller 140 performs a decompressing process on the image data or image file acquired from the memory card 171 to generate image data for display.

Further, the memory card 171 can store moving image data generated by an image processing performed by the camera controller 140. For example, the memory card 171 can store a compressed moving image file according to H.264/MPEG4 AVC which is a moving image compression standard. In addition, the memory card 171 can output moving image data or a moving image file previously stored therein, via the card slot 170. The moving image data or moving image file which is outputted from the memory card 171 is subjected to an image processing by the camera controller 140. For example, the camera controller 140 performs a decompressing process on the moving image data or moving image file which is acquired from the memory card 171, to generate moving image data for display.

The memory card 171 is an example of a storage unit. The storage unit may be detachably mounted in the camera body 100 like the memory card 171, or alternatively, may be fixedly mounted in the camera system 1.

A SIM card 181 is inserted and fixed in the SIM card holder 180. The SIM card 181 stores subscriber information for permitting connection to a telephone line.

The wireless communication unit 185 is a unit for wireless communication having an antenna unit, and has a function of wireless communication conforming to a telecommunication standard such as IEEE802.11n, Wi-Fi (registered trademark), Bluetooth (registered trademark), NFC, etc. When the power switch 132 of the operation unit 130 in the camera body 100 is operated, the camera controller 140 issues an instruction for connecting with a mobile terminal 300 (described later) which is previously designated. When a wireless connection with the mobile terminal 300 is established, the camera controller 140 acquires subscriber information stored in a SIM card 321 inserted in the SIM card holder 320 of the mobile terminal 300. Then, the camera controller 140 confirms whether or not the acquired subscriber information and the subscriber information of the SIM card 181 are matched with each other.

The telephone line communication unit 186 is a unit for 3G telephone line communication having an antenna unit. The telephone line communication unit 186 can connect to a telephone line on the basis of the subscriber information stored in the SIM card 181. When the camera controller 140 receives from the mobile terminal 300 a permission signal for connection to the telephone line, telephone line communication unit 186 sends an instruction for searching for a base station to the telephone line communication unit 186. The telephone line communication unit 186 does not connect to the telephone line until the camera controller 140 receives from the mobile terminal 300 the permission signal for connection to the telephone line.

The focal-plane shutter 190 is arranged at a front side (optical system side) of the CMOS image sensor 110. The focal-plane shutter 190 has two states including one state which shields a light passing through an optical system L toward the CMOS image sensor 110 and another state which transmits a light passing through the optical system L toward the CMOS image sensor 110. The focal-plane shutter 190 controls the exposure time of the CMOS image sensor 110.

The EVF (Electric View Finder) 195 is, for example, a liquid crystal display (LCD) device. The EVF 195 serves as a finder by enlarging and displaying an image with an eyepiece lens, and so on. The displayed content is the same as that displayed by the camera monitor 120, namely, the EVF 195 displays an image, and so on indicated by the image data for display. In addition, the camera body 100 is configured so that either one of the EVF 195 and the camera monitor 120 can be appropriately selected and used.

The EVF 195 is an example of a display unit provided in the camera body 100. As such a display unit, in addition to the above, a device that can display images such as an organic EL, an inorganic EL, or a plasma display panel, and so on can be used.

The power supply 160 supplies each component with electric power to be consumed in the camera system 1. For example, the power supply 160 may be a dry cell, or may be a secondary cell which can be charged. In addition, the power supply 160 may be a power supply unit that receives electric power supplied from an external power supply through a power cord, and so on, and supplies the received power to the camera system 1.

The body mount 150 engages with the lens mount 250. The body mount 150 supports the lens unit 200. In addition, the body mount 150 and the lens mount 250 are electrically connectable. The camera body 100 can transmit and receive at least one of data and a control signal to and from the lens unit 200, via the body mount 150 and the lens mount 250.

The lens unit 200 is mountable to the camera body 100, and forms an optical image of a subject. Specifically, the lens unit 200 includes the optical system L, a driving unit 215, the lens mount 250, and the lens controller 240.

The optical system L includes a focal lens, a zoom lens, and a correcting lens for optically stabilizing a camera shake. The optical system L forms an optical image of a subject on a light receiving surface of the CMOS image sensor 110.

The lens controller 240 controls operation of whole the lens unit 200, in accordance with a control signal transmitted from the camera controller 140.

2. Mobile Terminal (Mobile Station)

Figure 3:
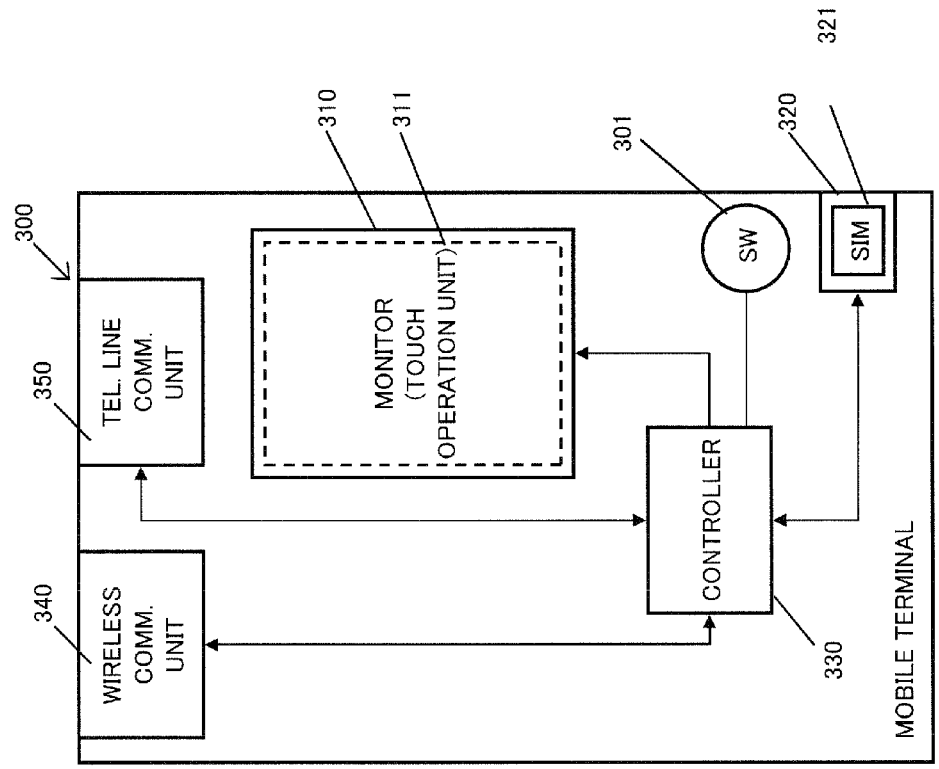
FIG. 3 is a circuit block diagram of a mobile terminal according to the present embodiment.

Referring to FIG. 3, the mobile terminal 300 is described below.

FIG. 3 is a circuit block diagram of the mobile terminal 300 (an example of an electronic apparatus). The mobile terminal 300 can be connected to the telephone line, and further can perform wireless communication by a wireless LAN. The mobile terminal 300 is, for example, a smart phone or a mobile phone.

The mobile terminal 300 includes a monitor 310, a touch operation unit 311, a controller 330, a wireless communication unit 340, and a telephone line communication unit 350.

The monitor 310 is a liquid crystal display (LCD). The monitor 310 may be located at any position on the mobile terminal 300. The monitor 310 is an example of a display unit provided in the mobile terminal 300. As a display unit, any device that can display images such as an organic EL, an inorganic EL, or a plasma display panel, and so on can be used in addition to the LCD.

The touch operation unit 311 is a capacitive touch panel. The touch operation unit 311 is arranged on a display surface of the monitor 310. The touch operation unit 311 is not limited to a capacitive touch panel, but may be a resistive film type touch panel.

SIM card 321 is inserted and fixed in the SIM card holder 320. In particular, the SIM card 321 stores subscriber information for permitting connection to the telephone line, which indicates the same subscription right as that of the SIM card 181 inserted and fixed in the SIM card holder 180 provided in the camera body 100.

The controller 330 controls each component of mobile terminal 300. The controller 330 controls the monitor 310 to display an icon, a menu, and so on. The controller 330 receives instructions from the power switch 301 and the touch operation unit 311. When a user touches the touch operation unit 311 with a finger, etc., the touch operation unit 311 detects a touched position. The controller 330 can perform predetermined operation, based on contents displayed on the monitor 310 and the touched position detected by the touch operation unit 311. The controller 330 controls whole of the mobile terminal 300.

The wireless communication unit 340 includes an antenna unit, and performs a wireless communication function conforming to a telecommunication standard such as IEEE802.11n, Wi-Fi (registered trademark), Bluetooth (registered trademark), NFC, and so on.

The telephone line communication unit 350 is a unit of a 3G telephone line communication, having an antenna unit. The telephone line communication unit 350 can connect to the telephone line by using the subscriber information stored in the SIM card 321.

A switching operation of connection to the telephone line between the camera system 1 and the mobile terminal 300 configured as described above is described below.

When the power switch 132 of the mobile terminal 300 is operated to ON by a user, the controller 330 detects power-ON of the mobile terminal 300, and then the telephone line communication unit 350 tries to search for a connectable base station and connect with the searched base station. Further, the wireless communication unit 340 searches for a connectable wireless communication apparatus (public wireless router, public LAN service). When a previously-designated wireless communication apparatus is found, the wireless communication unit 340 automatically connects with the found wireless communication apparatus. Then, the wireless communication unit 340 shifts to a waiting state for waiting for receiving a reference request of the subscriber information from the camera body 100.

In this state, when the power switch 132 of the operation unit 130 in the camera body 100 is turned ON, the camera body 100 first starts to connect wirelessly to the mobile terminal 300.

When the connection is established, the camera body 100 transmits a reference request of subscriber information to the mobile terminal 300 to exchange the subscriber information of the respective SIM cards with each other. Then, in the camera body 100, the camera controller 140 confirms matching of the subscriber information of the SIM card 321 in the mobile terminal 300 and the subscriber information of the SIM card 181. Also in the mobile terminal 300, the controller 330 confirms matching of the subscriber information of the SIM card 181 in the camera body 100 and the subscriber information of the SIM card 321. When it is confirmed that both pieces of the subscriber information are matched with each other by both of the camera controller 140 in the camera body 100 and the controller 330 in the mobile terminal 300, the controller 330 of the mobile terminal 330 sends the telephone line communication unit 350 an instruction to disconnect the connection to the telephone line.

When the disconnection of the telephone line is confirmed, the controller 330 of the mobile terminal 300 sends to the camera body 100 a connection permission signal for permitting connection to the telephone line via the wireless communication. When the camera controller 140 of the camera body 100 receives the connection permission signal for connection to the telephone line from the controller 330 of the mobile terminal 300, the camera controller 140 sends the telephone line communication unit 186 a base station search instruction (instruction to search for or find a base station) to connect to the telephone line.

Then, when the power switch 132 of the operation unit 130 in the camera body 100 is operated to OFF, the camera controller 140 of the camera body 100 sends an instruction to the telephone line communication unit 186 to disconnect the connection to the telephone line.

When the controller 140 of the camera body confirms the disconnection of the telephone line, the controller 140 sends a connection permission signal for permitting connection to the telephone line to the mobile terminal 300 via the wireless communication by the wireless communication unit 185. When the controller 330 of the mobile terminal 300 receives the connection permission signal for the telephone line from the camera body 100, the controller 330 sends the telephone line communication unit 350 a base station search instruction to connect to the telephone line. As a result, the mobile terminal 300 again connects to the telephone line, thus enabling communication via the telephone line.

As described above, in this embodiment, even when SIM cards storing the same subscriber information are inserted in both of the camera system 1 and the mobile terminal 300, the camera system 1 and the mobile terminal 300 are controlled so that either only one of them is connected to the telephone line.

3. Communication System

Conventionally, a telephone line (network) is managed by a telephone carrier. The telephone carrier provides subscriber information for a contract of communication with a subscriber (user). The subscriber information is stored in a SIM card. This SIM card is inserted in a communication apparatus (hereinafter referred to as "telephone line communication apparatus") provided with a telephone line communication unit, so that the communication apparatus becomes able to use telephone line.

It is possible to use only one telephone line communication apparatus with single subscriber information at a time. In other words, it is impossible to use a plurality of telephone line communication apparatuses with the single (the same) subscriber information at a time. Further, conventionally, single subscriber information is recorded in only one SIM card. For this reason, it is physically impossible to use a plurality of telephone line communication apparatuses with the single (the same) subscriber information at a time.

According to this embodiment, it is allowed to store the same subscriber information in a plurality of SIM cards. The present embodiment discloses a configuration for using the single subscriber information while switching a plurality of communication apparatuses, in cases where the plurality of SIM cards share the single (same) subscriber information. That is, in a situation that the plurality of SIM cards storing the single (same) subscriber information are inserted in the plurality of communication apparatuses respectively, the plurality of communication apparatuses directly and mutually control an operation to limit the number of the communication apparatuses which are allowed to use the telephone line to one. Using such a configuration causes additional communication with a base station and storing of additional information in SIM cards to be unnecessary.

Figure 4:
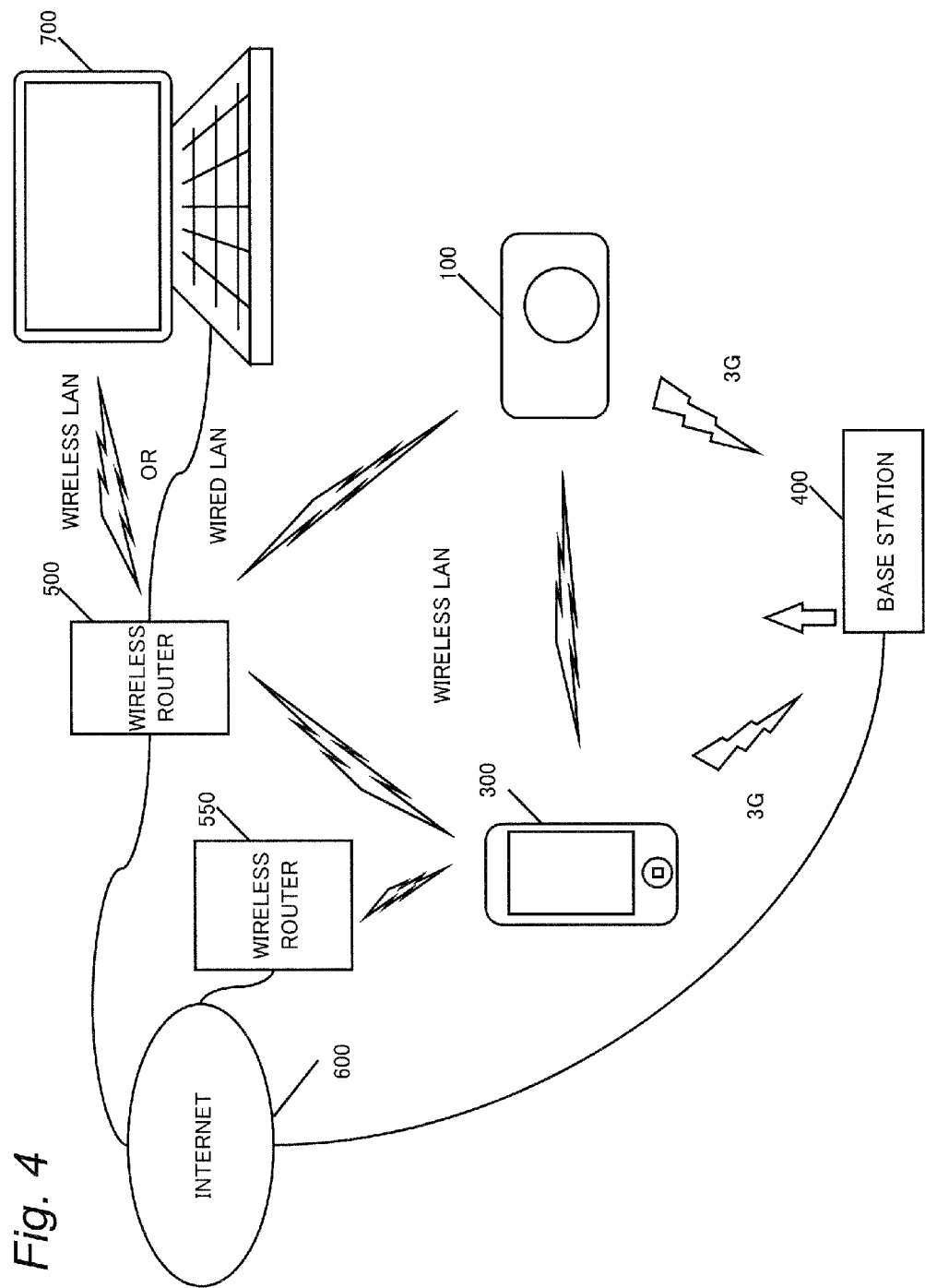
FIG. 4 is a schematic view of a communication system according to the present embodiment.

FIG. 4 is a drawing showing a configuration of a communication system according to the present embodiment. The communication system includes the camera body 100 and the mobile terminal 300. In this embodiment, as a communication environment, an environment is considered, which includes a base station 400 that allows a telephone line communication, a wireless router 500 that allows wireless communication, and a computer 700, in addition to the camera body 100 and the mobile terminal 300.

The wireless router 500 is a unit of wireless communication having an antenna unit, and has a wireless-communication function, such as the IEEE802.11n standard. The wireless router 500 is connected to the internet 600 through cable connection.

The computer 700 is connected with the wireless router 500 by wireless connection or by cable connection. When connected by wireless connection, a wireless communication unit having an antenna unit has to be built in the computer 700, or be externally connected to the computer 700.

There may be a case where a user makes a communication contract with a telephone carrier in advance, obtains single subscriber information, and then purchases a camera body. Alternatively, the user may purchase the camera body 100 and the mobile terminal 300 at the same time. Further, there may be a case where the user already purchased a camera body 100, and afterward the user purchases a mobile terminal 300.

In order to support all the above-mentioned purchase cases by the user, It is highly advantageous to use an installation function of a dedicated application which is provided with the camera body 100 and the mobile terminal 300. Here, the dedicated application refers to software having a specific function for performing communication through the internet, the wireless LAN, or the telephone line. Accordingly, the software proposed here has at least a function of wireless communication between the camera body 100 and the mobile terminal 300, a function of confirming matching of subscriber information of the SIM card 181 inserted in the camera body 100 and subscriber information of the SIM card 321 inserted in the mobile terminal 300, and a function of disconnecting telephone line.

4. Operation of Switching Telephone Line in Communication System

An operation of the communication system is described below. In this embodiment, a switching control of the telephone line connection between a first communication apparatus and a second communication apparatus which have the same subscriber information is described. In the following description, the camera body 100 is described as an example of a first communication apparatus having a relatively higher priority for using the telephone line, and the mobile terminal 300 is described as an example of a second communication apparatus having a relatively lower priority for using the telephone line.

In addition, it is assumed that the mobile terminal 300 is in powered on state, that the mobile terminal 300 is connected to the telephone line via the telephone line communication unit 350, and that the mobile terminal 300 is connected with a wireless router (internet) via the wireless communication unit 340. Further, the wireless communication unit 340 of the mobile terminal 300 is in a waiting state for waiting for receiving a reference request of subscriber information from the camera body 100.

4.1 Sequence Performed at Power-ON of Camera Body

Figure 5:
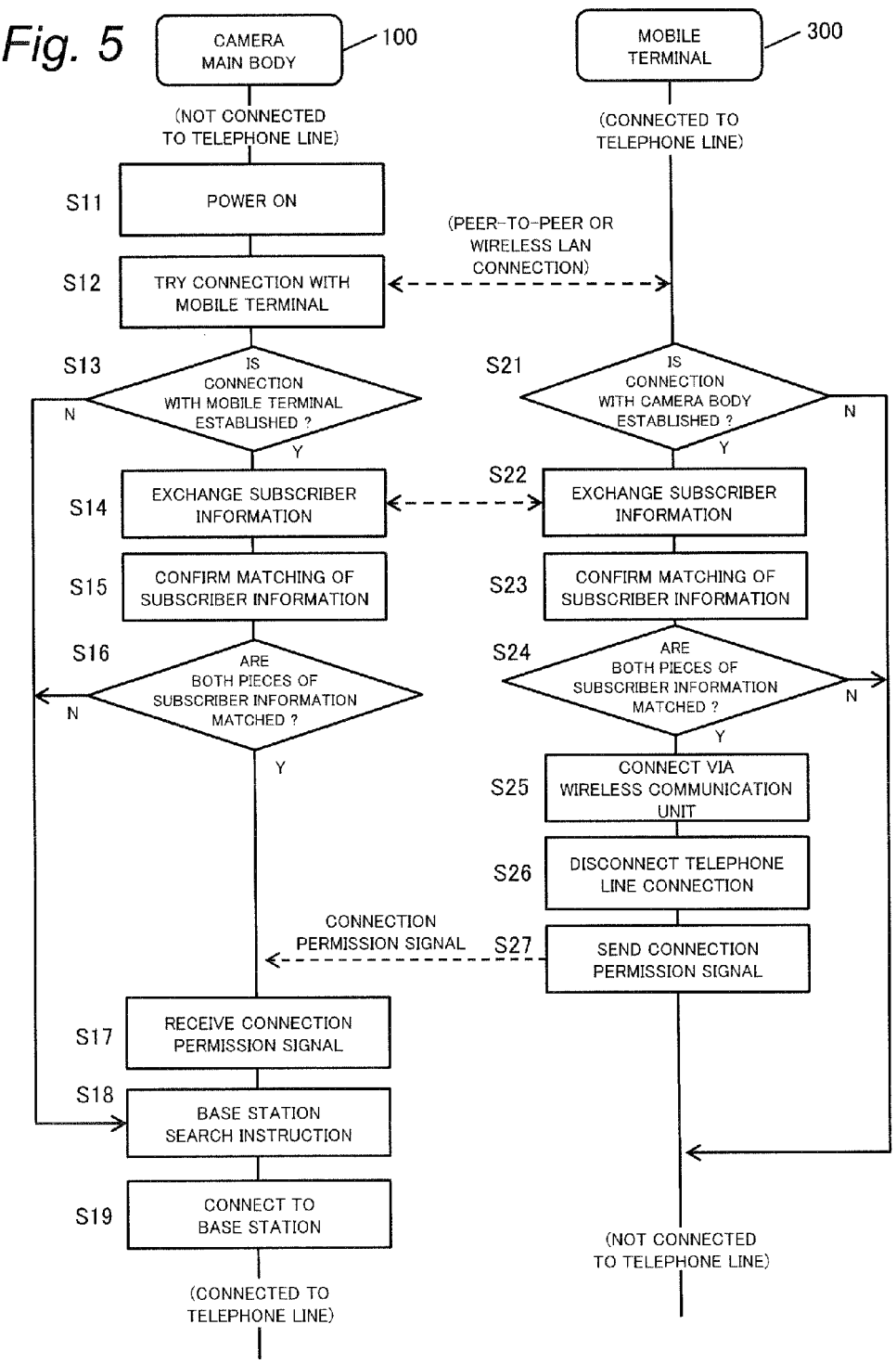
FIG. 5 is a drawing for describing telephone line switching operation in the communication system according to the present embodiment (when the camera body is turned ON).

An operation of the camera body 100 and the mobile terminal 300 when the power switch 132 of the operation unit 130 in the camera body 100 is turned ON in the above-assumed state is described below with reference to FIG. 5.

When the power switch 132 of the camera body 100 is turned ON (S11), the camera body 100 first tries to connect with the mobile terminal 300 via the wireless communication unit 185 (S12).

Specifically, the camera controller 140 sends the wireless communication unit 185 an instruction to try a peer-to-peer connection at first with the mobile terminal 300 which has an a SIM card storing the same subscriber information. The reason why to try the peer-to-peer connection at first is that a case where a user carries the camera body 100 and the mobile terminal 300 close to each other and uses them is assumed.

When a failure in a peer-to-peer connection occurs because of, for example, the mobile terminal 300 located away from the camera body 100, the camera controller 140 then sends the wireless communication unit 185 an instruction to try to connect with the public wireless router 550 (public wireless LAN service). When the connection with the public wireless router 550 (public wireless LAN service) is established, the controller 140 further performs connection to the internet 600 and performs connection with the mobile terminal 300 which has already established to connect to the internet 600. The above-mentioned connection is automatically performed by the camera controller 140.

As a result of the attempt of connection, when the connection with the mobile terminal 300 which is inserted with a SIM card storing the same subscriber information (YES at S13), the camera body 100 sends a reference request of subscriber information, as well as subscriber information stored in the SIM card in the camera body 100, to the mobile terminal 300. When the mobile terminal 300 receives the reference request of subscriber information, the mobile terminal 300 sends the subscriber information of the SIM card in the mobile terminal 300 to the camera body 100. In this manner, subscriber information of the respective SIM cards is exchanged with each other (S14, S22).

Next, in the camera body 100, the camera controller 140 confirms matching of the subscriber information of the SIM card 321 of the mobile terminal 300 and the subscriber information of the SIM card 181 (S15). In addition, in the mobile terminal 300, the controller 330 confirms matching of the subscriber information of the SIM card 181 of the camera body 100 and the subscriber information of the SIM card 321 (S23).

In the camera body 100, when it is confirmed that both pieces of the subscriber information are matched with each other (YES at S16), the camera controller 140 enters a waiting state for waiting for receiving a connection permission signal from the mobile terminal 300.

In the mobile terminal 300, when it is confirmed that both pieces of the subscriber information are matched with each other (YES at S24), the controller 330 of the mobile terminal 300 sends the wireless communication unit 340 an instruction to connect to the internet via the wireless communication unit (S25). Then, the controller 330 sends the telephone line communication unit 350 an instruction to disconnect the connection to the telephone line (S26). As a result, in the mobile terminal 300, the connection to the telephone line is disconnected.

As described above, in this embodiment, the controller 330 of the mobile terminal 300 determines whether or not the camera body 100 is operating, on the basis of the establishment of the connection of the mobile terminal 300 and the camera body and the matching of the both pieces of the subscriber information. In addition, when determining that the camera body 100 is operating, the telephone line connection is disconnected.

When the mobile terminal 300 confirms the disconnection of the telephone line, the controller 330 sends a connection permission signal for connection to the telephone line to the camera body 100 via the wireless communication unit 340 (S27).

Then, when the camera body 100 receives the connection permission signal for connection to the telephone line from the mobile terminal 300 (S17), the camera controller 140 sends the telephone line connection unit 186 a base station search instruction to connect to the telephone line (S18). When a base station 400 is found, the telephone line communication unit 186 tries the telephone line connection with the base station 400 (S19). When the telephone line connection with the base station 400 is established, the camera body 100 becomes able to perform communication through the telephone line.

On the other hand, when it is not confirmed that the both pieces of the subscriber information are not matched with each other (NO at S16), the camera body 100 tries the telephone line connection with the base station 400 (S18, S19).

When the power of the mobile terminal 300 is OFF upon turning on of the camera body 100 (S11), the camera body 100 cannot establish connection with the mobile terminal 300. In this case (NO at S13), the controller 140 of the camera body 100 sends the telephone line communication unit 186 a base station search instruction to connect to the telephone line (S18) and try to connect to the base station 400 via the telephone line (S19). As a result, the camera body 100 is connected to the telephone line, whereas the power of the mobile terminal is OFF and thus the mobile terminal is not connected to the telephone line. Accordingly, this control causes no problem with the telephone line connection.

4.2 Sequence Performed at Power-OFF of Camera Body

Figure 6:
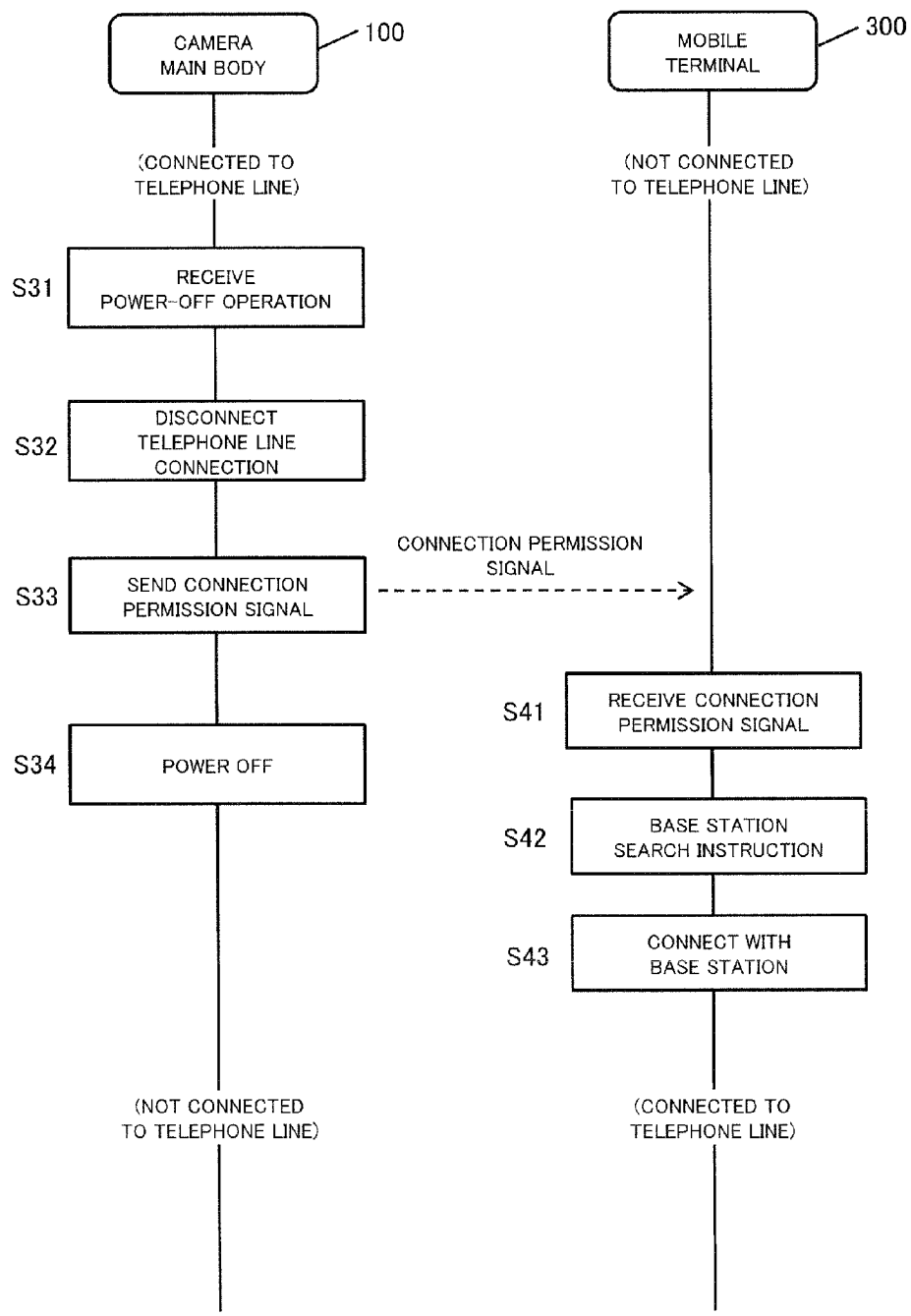
FIG. 6 is a drawing for describing telephone line switching operation in the communication system according to the present embodiment (when the camera body is turned OFF).

Referring to FIG. 6, an operation of the camera body 100 and the mobile terminal 300 performed when the power switch 132 of the operation unit 130 is turned OFF in a state that the camera body 100 is connected to the telephone line is described below.

When the camera body 100 connecting to the telephone line is turned OFF by the operation by the user (S31), the camera controller 140 sends the telephone line communication unit 186 an instruction to disconnect the connection to the telephone line (S32). When the camera controller 140 confirms the disconnection of the telephone line, the wireless communication unit 185 sends the mobile terminal 300 a connection permission signal for connection to the telephone line (S33).

When the controller 330 of the mobile terminal 300 receives the connection permission signal (S41), the controller 330 sends the telephone line communication unit 350 a base station search instruction to connect to the telephone line (S42). When the telephone line communication unit 350 establishes the telephone line connection with the base station 400 (S43), the mobile terminal 300 becomes able to perform communication through the telephone line.

As described above, according to the communication system of this embodiment, when the camera body 100 is turned ON in a state that the mobile terminal 300 is connected to the telephone line (S11), the telephone line connection of the mobile terminal 300 is disconnected (S25), and the telephone line connection of the camera body 100 is established (S19). Subsequently, when the camera body 100 is turned OFF (S31), the telephone line connection of the mobile terminal 300 is established again (S43). According to such a control, when single (same) subscriber information is shared by a plurality of communication apparatuses, switching of the telephone line connection among the plurality of communication apparatuses can be achieved.

4.3 Specific Operation Examples

Several specific examples associated with usage conditions of a user are described. The user may not carry both of the mobile terminal 300 and the camera body 100 at the same time, and therefore, specific operations of the mobile terminal 300 and the camera body 100 when they are located away from each other are described below.

4.3.1 Use Case 1

An operation is described below, in a case where a user carrying only the camera system 1 goes outside while leaving the mobile terminal 300 which is powered ON at user's home. Here, the mobile terminal 300 is connected to the Internet 600 via the telephone line communication unit 350 at user's home.

In this case, the mobile terminal 300 and the camera body 100 cannot connect with each other through peer-to-peer connection. At this time, when power switch 132 of the operation unit 130 of the camera body 100 is turned ON (S11), the camera controller 140 of the camera body 100 tries to connect with the mobile terminal 300 which is inserted with a SIM card storing the same subscriber information. The camera controller 140 recognizes that the peer-to-peer connection is failed, and sends an instruction to try to connect with a public wireless LAN service.

When the connection to the Internet through the public wireless LAN service via the public wireless router 550 is established, the camera controller 140 automatically performs connection with the mobile terminal 300 which has already established to connect to the Internet 600 at home (S12). When the connection with the mobile terminal 300 is established (YES at S13), the camera controller 140 of the camera body 100 performs confirmation of matching of the subscriber information of the SIM card 321 in the mobile terminal 300 and the subscriber information of the SIM card 181 in the camera body 100 (S15). In addition, the controller 330 of the mobile terminal 300 performs confirmation of matching of the subscriber information of the SIM card 181 in the camera body 100 and the subscriber information of the SIM card 321 in the mobile terminal 300 (S23).

When the matching of the both subscriber information is confirmed (YES at S24), the controller 330 of the mobile terminal 300 starts to connect to the Internet 600 via the wireless communication unit 340, and switches the connection with the camera body 100 to the connection via the wireless communication unit 340 (S25). Then, the controller 330 of the mobile terminal 300 sends the telephone line communication unit 350 an instruction to disconnect the connection to the telephone line (S26). When the controller 330 of the mobile terminal 300 confirms disconnection of the telephone line, the wireless communication unit 340 sends a connection permission signal for connection to the telephone line to the camera body 100 (S27).

Then, when the camera controller 140 of the camera body 100 receives the connection permission signal from the controller 330 of the mobile terminal 300 (S17), the camera controller 140 sends the telephone line communication unit 186 a base station search instruction to connect to the telephone line (S18). When the telephone line communication unit 186 establishes the telephone line connection with the base station 400 (S19), the camera body 100 becomes able to perform communication through the telephone line.

4.3.2 Use Case 2

Next, an operation is described below, in a case where the user carrying only the camera system 1 goes outside while leaving the mobile terminal 300 of which power is powered ON at home and where the power of the mobile terminal 300 runs out while the user is going out. The example described below can be applied to a case where the user carrying only the camera system 1 goes out while leaving the mobile terminal 300 which is powered OFF at home.

In this case, a communication carrier recognizes that the subscriber information of the SIM card 321 is not active, and therefore recognizes that the mobile terminal 300 is not using the telephone line. When the power switch 132 of the operation unit 130 of the camera body 100 is turned ON by the user (S11), the camera controller 140 of the camera body 100 tries to connect with the mobile terminal 300 provided with the SIM card 321 storing the same subscriber information (S12).

The camera controller 140 first tries to connect with the mobile terminal 300 via the wireless communication unit 185 with the peer-to-peer connection. When the camera controller 140 recognizes that the connection with the mobile terminal 300 with the peer-to-peer connection is failed, the camera controller 140 then tries to connect with the public wireless router 550 (namely, the public wireless LAN service). When the camera controller 140 of the camera body 100 establishes connection to the Internet 600 via the public wireless router 550, namely via the public wireless LAN service, the camera controller 140 automatically tries to connect with the mobile terminal through the Internet 600.

However, at this time, the power of the mobile terminal 300 is OFF, connection cannot be established (NO at S13). At this time, it can be determined that the mobile terminal 300 is not connected to the telephone line via the telephone line communication unit 350. Therefore, the camera controller 140 of the camera body 100 sends the telephone line communication unit 186 a base station search instruction to connect to the telephone line (S18). When the search of a base station succeeds, it is determined that the subscriber information of the SIM card 181 is not active. Thus, the subscriber information is activated and then the telephone line is connected immediately (S19).

4.3.3 Use Case 3

In a case where the user carrying only the mobile terminal 300 goes outside and the camera body 100 which is left at home is operated by, for example, someone in user's family, the camera body 100 is automatically connected to the telephone line as described above. Therefore, in the mobile terminal 300 the telephone line connection is disconnected before the user knows that. In order to solve this problem, the camera body 100 may be provided with a mode for setting whether or not to allow connection to the telephone line. When the mode is set not to allow connection to the telephone line, the above-described problem can be avoided. However, in a case where the user forgot to set that mode, when the power of the camera body 100 is turned ON and as a result the disconnect of the telephone line is confirmed in the mobile terminal 300, the controller 330 of the mobile terminal 300 tries to connect with a public wireless LAN service.

Then, when the connection to the Internet 600 by the public wireless LAN service is established, the controller 330 may connect with the camera body 100, and in the camera body 100 the mode may be changed to a mode for not allowing connection to the telephone line.

According to the present disclosure, exclusive use of a plurality of telephone line connection apparatuses inserted a plurality of SIM cards storing the same subscriber information is possible, resulting in improved convenience for a user.

5. Effects, etc.

A mobile terminal 300 according to the above-described embodiment can share subscriber information for connecting to a telephone line with a camera body 100. The mobile terminal 300 includes a telephone line communication unit 350 operable to communicate with a base station 400 through the telephone line, a wireless communication unit 340 operable to perform communication which is different from communication performed by the telephone line communication unit 350, and a controller 330 that detects whether or not the camera body 100 is operating with the wireless communication unit 340, and controls communication via the telephone line communication unit 350 and the wireless communication unit 340. The controller 330 controls whether to perform communication through the telephone line with the telephone line communication unit 350 on the basis of the detection result.

In addition, the camera body 100 according to the above-described embodiment is capable of sharing subscriber information for connecting to the telephone line with the mobile terminal 300. The camera body 100 includes a telephone line communication unit 186 operable to communicate with a base station 400 through the telephone line, a wireless communication unit 185 operable to perform communication which is different from communication by the telephone line communication unit 186, and a camera controller 140 that controls communication via the telephone line communication unit 186 and the wireless communication unit 185. The camera controller 140 obtains subscriber information for connecting to the telephone line, which is stored in the mobile terminal 300, from the mobile terminal 300 via the wireless communication unit 185. The camera controller 140 compares the obtained subscriber information with subscriber information stored in the camera body 100. When both pieces of subscriber information are matched with each other, the camera controller 140 starts communication through the telephone line by the telephone line communication unit 186 upon receipt of the connection permission for connecting to the telephone line.

According to the above-described configuration, it is possible to exclusively use the telephone line between the mobile terminal 300 and the camera body 100 sharing the same subscriber information (an example of the connection information).

Other Embodiments

As described above, the first embodiment is described as an example of the art disclosed in the present application. However, the art in the present disclosure is not limited thereto, and is also applicable to various embodiments to which modifications, substitutions, additions, or omissions, etc. is suitably applied. In addition, component elements described in the first embodiment can be combined to obtain a new embodiment. Other embodiments are described below.

(1) In the above embodiment, as to a first communication apparatus and a second communication apparatus which share the same subscriber information, the camera body is described as an example of a first communication apparatus having a relatively higher priority for using the telephone line, and the mobile terminal is described as an example of a second communication apparatus having a relatively lower priority for using the telephone line. However, the idea of the switching control of the telephone line as described above can be applied to a case where the first communication apparatus is the mobile terminal 300 and the second communication apparatus is the camera body 100.

(2) In the above embodiment, the camera body 100 tries to connect with the mobile terminal 300 when turned ON, and tries to connect to the telephone line when receiving the connection permission signal from the mobile terminal 300. However, the camera body 100 may have a mode for trying to connect immediately to the telephone line when the camera body 100 is turned ON, without connecting to the mobile terminal 300 and receiving the connection permission signal as described above. This mode is helpful when it is obvious for a user that the mobile terminal 300 which is inserted with a SIM card storing the same subscriber information does not use the telephone line.

(3) In the above embodiment, as described with reference to FIG. 6, when the camera body 100 is operated to turn OFF with the camera body 100 connected to the telephone line (S31), a connection permission signal is sent to the mobile terminal 300 (S33). Then, the mobile terminal 300 reconnects to the telephone line in response to the connection permission signal (S42, S43). However, a method for the mobile terminal 300 reconnecting to the telephone line is not limited to this method. For example, once the camera body 100 and the mobile terminal 300 establish connection (for example, WiFi connection) between them by the wireless communication units 185 and 340, the connection between the camera body 100 and the mobile terminal 300 is maintained, and during the connection predetermined data is communicated between them. Therefore in this situation, when the communication between the camera body 100 and the mobile terminal 300 is not detected for a predetermined period, it is considered that the camera body 100 is turned OFF. Therefore, when communication between the camera body 100 and the mobile terminal 300 is not detected for a predetermined period, the mobile terminal 300 may search for a base station to connect to the telephone line.

(4) When the camera body 100 and the mobile terminal 300 are located relatively close to each other and peer-to-peer connection is performed between them by the wireless communication units 185 and 340, one of the camera body 100 and the mobile terminal 300 may be connected to an external apparatus (for example, a public wireless router) and an external network (for example, the internet) (namely, tethering), via the other of the camera body 100 and the mobile terminal 300.

For example, when the camera body 100 is turned on so that the camera body 100 is connected to the telephone line via the telephone line communication unit 186 and the mobile terminal 300 is not connected to the telephone line, the mobile terminal 300 may connect with an external apparatus (for example, a public wireless router), an external network (for example, the Internet), and so on. through the telephone line connection of the camera body 100. In this case, the camera body 100 and the mobile terminal 300 are connected with each other via the wireless communication units 185 and 340. The mobile terminal 300 connects with the camera body 100 via the wireless communication 340, and then connects with an external apparatus (for example, a public wireless router) or an external network (for example, the internet), etc. through the telephone line connection of the camera body 100. In other words, the camera body 100 may connect with the mobile terminal 300 via the wireless communication unit 185, and may relay communication between the mobile terminal 300 and an external apparatus, and so on. through the telephone line connection.

The mobile terminal 300 may be provided with the tethering function as described above. Namely, when the mobile terminal 300 is connected to the telephone line via the telephone line communication unit 350 and the camera body 100 is not connected to the telephone line, the camera body 100 may connect with an external apparatus (for example, a public router), an external network (for example, the internet), and so on. through the telephone line connection of the mobile terminal 300. In other words, the mobile terminal 300 may connect with the camera body 100 via the wireless communication unit 340, and relay communication between the camera body 100 and an external apparatus, and so on through the telephone line connection.

(5) In the above embodiment, the digital camera (camera body) and the mobile terminal (for example, a smartphone) are described as examples of communication apparatuses inserted with SIM cards storing the same subscriber information. However, any communication apparatuses can be used provided that they can be inserted with SIM cards. That is, the above-described technical idea can be applied to switching control of the telephone line connection among a plurality of communication apparatuses inserted with SIM cards storing the same subscriber information.

(6) In the above embodiment, the mobile terminal 300 and the camera body 100 are examples of an electronic apparatus. The telephone line communication units 350 and 186 are examples of a first communication unit. The wireless communication units 340 and 185 are examples of a second communication unit. The controller 330 is an example of a detection unit and a controller. The camera controller 140 is an example of a controller. Subscriber information stored in a SIM card is an example of connection information for connecting to a specific communication line. The public wireless router 550 is an example of an external communication apparatus.

(7) The wireless communication unit 185 and the telephone line communication unit 186 in the camera body 100 and the wireless communication unit 340 and the telephone line communication unit 350 in the mobile terminal 300 may be, for example, made up by dedicated communication module devices including electric circuits, respectively. The camera controller 140 and the lens controller 240 in the camera system 1 and the controller 330 in the mobile terminal 300 may be made up by processors executing software to provide predetermined functions or dedicated electric circuits. That is, each controller can be made up by CPU, MPU, DSP, FPGA, ASIC, and so on.

As described above, embodiments are described as examples of the art according to the present disclosure. For this purpose, the accompanying drawings and the detailed descriptions are provided.

Accordingly, the components described in the accompanying drawings and the detailed description may include not only components which are necessary to solve the problem, but also components which are unnecessary to solve the problem for exemplifying the art as described above. Therefore, it should not immediately be construed that the unnecessary components are necessary as such unnecessary components are described in the accompanying drawings or the detailed description.

In addition, the embodiments as described above are to exemplify the art in the present disclosure, and therefore, the embodiments can be applied various kinds of modifications, substitutions, additions, omissions, and so on, provided that they fall within the scope of the claims or equivalents thereof.

The present disclosure is applicable to electronic apparatuses capable of perform communication through the telephone line.

What is claimed is:

1. An electronic apparatus capable of sharing connection information for connecting to a specific communication line with another apparatus, comprising:
   a first communication unit configured to communicate with a base station through the specific communication line;
   a second communication unit configured to perform communication which is different from the communication performed by the first communication unit;
   a detection unit configured to detect, via the second communication unit, whether or not the another apparatus is operating; and
   a controller configured to control the communications performed by the first and second communication units, wherein
   when the detection unit detects that the another apparatus is operating, the controller controls the first communication unit to change communication through the specific communication line from being connected to being disconnected.

2. The electronic apparatus according to claim 1, wherein
   the electronic apparatus stores first connection information for connecting to the specific communication line,
   the another apparatus stores second connection information for connecting to the specific communication line, and
   the detection unit compares the first connection information with the second communication, and
   when both of the first connection information and the second connection information are matched with each other, the detection unit detects that the another apparatus is operating.

3. The electronic apparatus according to claim 1, wherein the controller controls the first communication unit to change the communication through the specific communication line from being connected to being disconnected, and then sends connection permission for connecting to the specific communication line, to the another apparatus via the second communication unit.

4. The electronic apparatus according to claim 1, wherein when the controller controls the first communication unit to change the communication through the specific communication line from being connected to being disconnected, the controller communicates with the another apparatus through the second communication unit and communicates with an external communication apparatus through the another apparatus.

5. The electronic apparatus according to claim 1, wherein the connection information is subscriber information stored in a SIM card (Subscriber Identity Module Card).

6. The electronic apparatus according to claim 1, wherein the second communication unit performs communication conforming to any one of IEEE 802.11n standard, WiFi standard (registered trademark), and Bluetooth standard (registered trademark).

7. An electronic apparatus capable of sharing connection information for connecting to a specific communication line with another apparatus, comprising:
   a first communication unit configured to communicate with a base station through the specific communication line;
   a second communication unit configured to perform communication which is different from the communication performed by the first communication unit; and
   a controller configured to control the communication performed by the first and second communication units, wherein
   the controller
      obtains connection information for connecting to the specific communication line, which is stored in the other apparatus, from the another apparatus via the second communication unit,
      compares the obtained connection information with connection information for connecting to the specific communication line, which is stored in the electronic apparatus, and
      when both pieces of connection information are matched with each other, changes communication through the specific communication line by the first communication unit from being disconnected to being connected upon receipt of connection permission for connecting to the specific communication line from the other apparatus.

8. The electronic apparatus according to claim 7, wherein when the communication through the specific communication line by the first communication unit is made disconnected, the controller performs communication with the another apparatus through the second communication unit, and relays communication between the another apparatus and an external communication apparatus.

9. The electronic apparatus according to claim 7, wherein the connection information is subscriber information stored in a SIM card (Subscriber Identity Module Card).

10. The electronic apparatus according to claim 7, wherein the second communication unit performs communication conforming to any one of IEEE 802.11n standard, WiFi standard (registered trademark), and Bluetooth standard (registered trademark).

* * * * *